United States Patent [19]
Kobayashi et al.

[11] Patent Number: 5,940,563
[45] Date of Patent: Aug. 17, 1999

[54] RECEPTACLE OPTICAL MODULE

[75] Inventors: Kazuhiko Kobayashi; Shunichi Sato; Masaki Kuribayashi; Takashi Yamaguchi, all of Sapporo; Hironao Hakogi, Kawasaki, all of Japan

[73] Assignee: Fujitsu Limited, Kawasaki, Japan

[21] Appl. No.: 08/909,018

[22] Filed: Aug. 11, 1997

[30] Foreign Application Priority Data

Mar. 5, 1997 [JP] Japan ................................. 9-050419

[51] Int. Cl.⁶ ..................................................... G02B 6/36
[52] U.S. Cl. ................................................................ 385/92
[58] Field of Search ................................ 385/88, 89, 90, 385/91, 92, 93

[56] References Cited

U.S. PATENT DOCUMENTS

| | | | |
|---|---|---|---|
| 4,767,179 | 8/1988 | Sampson et al. | 385/92 |
| 5,202,943 | 4/1993 | Carden et al. | 385/92 |

Primary Examiner—Hung Ngo
Attorney, Agent, or Firm—Staas & Halsey

[57] ABSTRACT

A receptacle optical module including a fixed housing adapted to be fixed to a mother board (substrate); an optical semiconductor assembly having an optical semiconductor chip for performing conversion between an optical signal and an electrical signal; a plurality of lead pins fixed to the fixed housing for mechanically fixing the fixed housing to the mother board and electrically connecting the optical semiconductor chip to the mother board; a movable housing pivotably provided on the fixed housing for supporting the optical semiconductor assembly; and a receptacle mechanism for detachably holding an optical connector in the movable housing so as to optically connect the optical semiconductor chip to the optical connector. With this configuration, the movable housing for supporting the optical semiconductor assembly is pivotably provided on the fixed housing, so that the optical connector can be easily attached/detached, and possible bending of the lead pins due to attachment/detachment of the optical connector is suppressed.

8 Claims, 12 Drawing Sheets

RECEPTACLE OPTICAL MODULE

BACKGROUND OF THE INVENTION

1. Field of the Invention

The present invention relates generally to an optical module used to perform electro/optical conversion (E/O conversion) and/or opto/electrical conversion (O/E conversion) in electronic equipment such as a transmission device, and more particularly to a receptacle optical module having a receptacle mechanism for detachably holding an optical connector.

2. Description of the Related Art

An optical module to which an interface using an optical fiber is applied undergoes a manufacturing limitation on heat resistance of a coating of the optical fiber in mounting the module on a mother board (substrate) by soldering. That is, a pigtail type of optical module fixedly having an optical fiber cannot be originally adapted to a flow soldering process suitable for automation. In view of such a circumstance, there is provided a receptacle optical module having a receptacle mechanism for detachably holding an optical connector.

FIG. 1 is a perspective view of electronic equipment to which the present invention is applicable. In FIG. 1, a telephone exchange 2 is shown as the electronic equipment. The exchange 2 is provided with a rack 4 and a plurality of plug-in units 6 mounted in the rack 4 in a plug-in manner. Each plug-in unit 6 has a mother board (substrate) 8, a receptacle optical module 10 mounted on the mother board 8, and a connector 12 for electrically connecting the mother board 8 to another unit or device.

The details of the receptacle optical module 10 to which the present invention is applicable will be described later. The prior art of a receptacle optical module will now be described.

FIGS. 2 and 3 are a partially cutaway, plan view and a sectional view of a receptacle optical module in the prior art, respectively. This module has a housing 14 consisting of a lower housing 14A and an upper housing 14B. There are provided in the housing 14 two optical semiconductor assemblies 16 and a printed wiring board 18 to which each assembly 16 is electrically connected. To optically connect each optical semiconductor assembly 16 to an optical connector 19, a receptacle mechanism 20 for detachably holding the optical connector 19 is provided.

Each optical semiconductor assembly 16 has an optical semiconductor chip 22, leads 24 for electrically connecting the chip 22 to the printed wiring board 18, an optical fiber 26 optically coupled to the chip 22 by a lens (not shown), and a ferrule 28 in which the optical fiber 26 is inserted and fixed. The chip 22 is a light emitting element such as an LD (laser diode) and an LED (light emitting diode) or a photodetector such as a PD (photodiode). The receptacle mechanism 20 includes an elastically deformable sleeve (slitted sleeve) 32 for holding the ferrule 28 of the optical semiconductor assembly 16 and a ferrule 30 of the optical connector 19 in alignment with each other.

The printed wiring board 18 is provided with a plurality of lead pins 34 extending perpendicularly to the printed wiring board 18. The lead pins 34 are fixed by soldering to the mother board 8 through the lower housing 14A. Accordingly, both electrical connection of the printed wiring board 18 to the mother board 8 and mechanism fixing of the receptacle optical module to the mother board 8 are effected.

As shown in FIG. 3, attachment/detachment of the optical connector 19 with respect to the module is performed in a direction shown by an arrow substantially parallel to the mother board 8. Accordingly, in performing the attachment/detachment operation of the optical connector 19, a stress is generated in each lead pin 34 in such a direction as to bend each lead pin 34. As a result, the reliability of electrical connection between each lead pin 34 and the mother board 8 and between each lead pin 34 and the printed wiring board 18 is reduced.

As well understood with reference to FIG. 1, the attachment/detachment of each optical connector 19 must be carried out by moving the optical connector 19 in parallel to the mother board 8 at a position near the mother board 8. Accordingly, the attachment/detachment of each optical connector 19 is troublesome.

Further, it is necessary to ensure a space for the attachment/detachment of each optical connector 19 on the mother board 8. Accordingly, a degree of freedom of location of the receptacle optical module on the mother board 8 is small.

SUMMARY OF THE INVENTION

It is therefore an object of the present invention to provide a receptacle optical module which can eliminate a reduction in reliability due to attachment/detachment of an optical connector.

It is another object of the present invention to provide a receptacle optical module which can facilitate attachment/detachment of an optical connector.

It is still another object of the present invention to provide a receptacle optical module which can be mounted on a mother board (substrate) with a large degree of freedom of location.

In accordance with the present invention, there is provided a receptacle optical module comprising a fixed housing adapted to be fixed to a mother board (substrate); an optical semiconductor assembly having an optical semiconductor chip for performing conversion between an optical signal and an electrical signal; a plurality of lead pins fixed to the fixed housing for mechanically fixing the fixed housing to the mother board and electrically connecting the optical semiconductor chip to the mother board; a movable housing pivotably provided on the fixed housing for supporting the optical semiconductor assembly; and a receptacle mechanism for detachably holding an optical connector in the movable housing so as to optically connect the optical semiconductor chip to the optical connector.

With this configuration, the movable housing for supporting the optical semiconductor assembly is pivotably provided on the fixed housing, so that at least the following operations can be obtained.

(1) By the use of the movable housing, the optical connector can be attached/detached in a direction inclined or parallel to the longitudinal direction of the lead pins. Accordingly, a bending stress is hardly generated in each lead pin in attaching/detaching the optical connector, thereby improving the reliability of the receptacle optical module.

(2) By the use of the movable housing, it is unnecessary to carry out attachment/detachment of the optical connector at a position near the mother board. Accordingly, the optical connector can be easily attached/detached.

(3) By the use of the movable housing, a space on the mother board for attachment/detachment of the optical connector can be reduced. Accordingly, a degree of freedom of location of the receptacle optical module can be enlarged.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
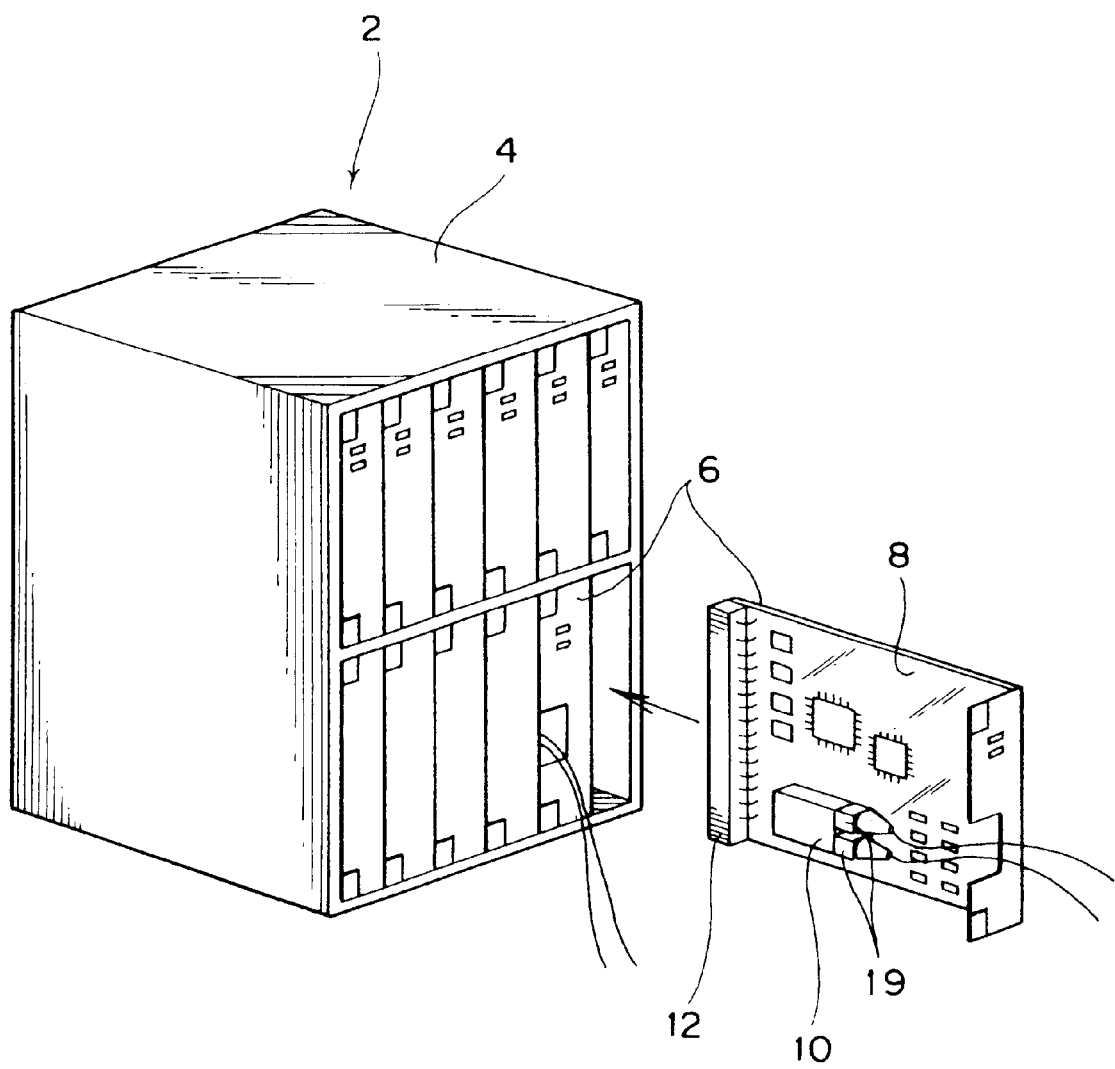
FIG. 1 is a perspective view of electronic equipment to which the present invention is applicable.

Some preferred embodiments of the present invention will now be described in detail. Throughout the drawings, substantially the same parts are denoted by the same reference numerals, and the description of the parts denoted by the same reference numerals may be omitted to avoid repetition.

Figure 4:
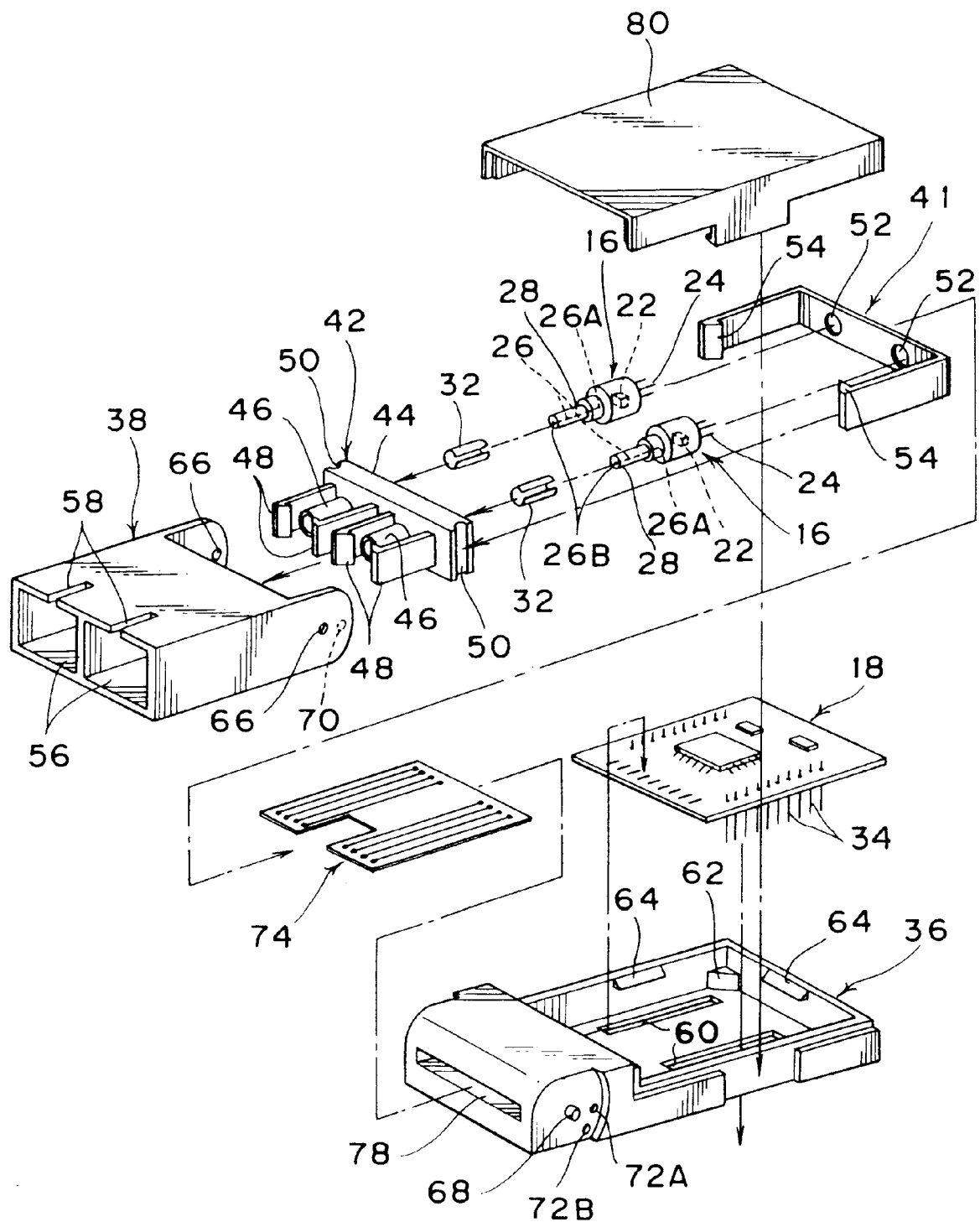
FIG. 4 is an exploded perspective view showing a first preferred embodiment of the receptacle optical module according to the present invention.

FIG. 4 is an exploded perspective view showing a first preferred embodiment of the receptacle optical module according to the present invention. The receptacle optical module shown in FIG. 4 has a fixed housing 36, a movable housing 38 pivotably provided on the fixed housing 36, and two optical semiconductor assemblies 16 fixed to the movable housing 38.

Figure 3:
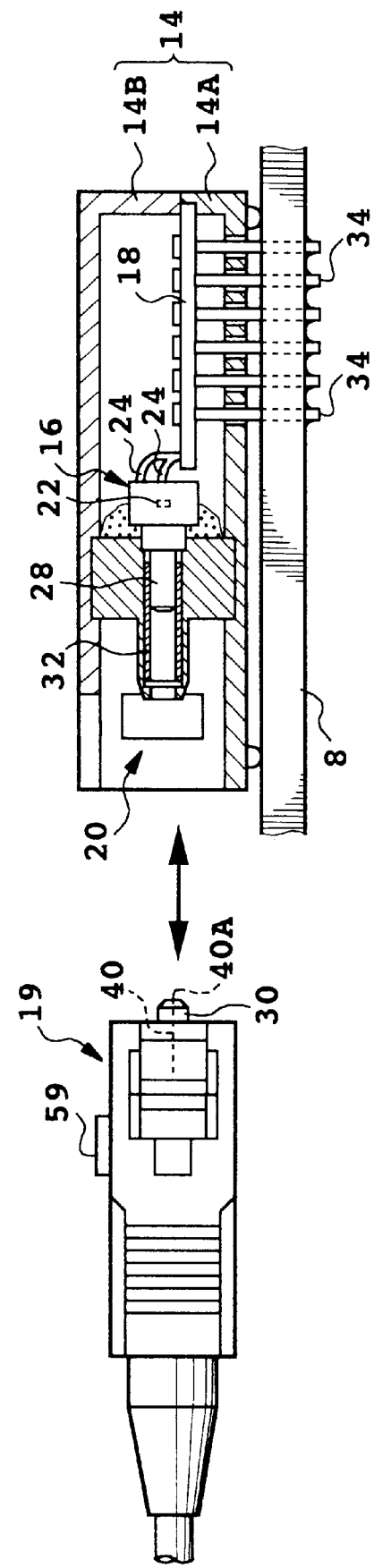
FIG. 3 is a sectional view of the receptacle optical module shown in FIG. 2.

Each of the optical semiconductor assemblies 16 is provided with an optical semiconductor chip 22, a plurality of (three in this preferred embodiment) leads 24 connected to the chip 22, a short optical fiber 26 for optically connecting the chip 22 to an optical connector 19 (see FIG. 3), and a ferrule 28 in which the optical fiber 26 is inserted and fixed. The chip 22 is a light emitting element such as an LD (laser diode) and an LED (light emitting diode) or a photodetector such as a PD (photodiode). A first end 26A of the optical fiber 26 is optically coupled to the chip 22 by a lens (not shown) incorporated in the optical semiconductor assembly 16. When the optical connector 19 (see FIG. 3) is mounted on this receptacle optical module, a second end 26B of the optical fiber 26 comes to abutment against an end face 40A of an optical fiber 40 provided in the optical connector 19 in alignment with each other, thereby obtaining optical coupling between the chip 22 and the optical connector 19.

To make such aligned abutment of the second end 26B of the optical fiber 26 and the end face 40A of the optical fiber 40 in the optical connector 19, an elastic sleeve (slitted sleeve) 32 is used for each optical semiconductor assembly 16. The elastic sleeve 32 is formed of an elastic material such as phosphor bronze, and has one slit extending in its axial direction.

The configuration of this receptacle optical module will now be described in detail as showing a procedure of assembling of the module. First, the optical semiconductor assemblies 16 and the elastic sleeves 32 are mounted to a receptacle 42 by a hook member 41. The receptacle 42 is integrally formed with a plate portion 44, two sleeve portions 46 each having a hole for engaging the corresponding elastic sleeve 32, and two pairs of hook portions 48 each provided for the corresponding sleeve portion 46. Each hook portion 48 serves to detachably hold the optical connector 19 in cooperation with a known hook holder mechanism provided in the optical connector 19. Grooves 50 are formed on the opposite ends of the plate portion 44.

The hook member 41 has two holes 52 each for allowing pass of the leads 24 of the corresponding optical semiconductor assembly 16, and two hooks 54 each for engaging the corresponding groove 50 of the receptacle 42. Accordingly, each optical semiconductor assembly 16 is fixed to the receptacle 42 by engaging the elastic sleeve 32 into the sleeve portion 46, inserting the ferrule 28 of the optical semiconductor assembly 16 into the elastic sleeve 32 up to its intermediate position, and mounting the hook member 41 to the receptacle 42 in this condition. A sectional structure at this time corresponds to the sectional structure of the receptacle mechanism 20 shown in FIG. 3, so it is recommended to see also FIG. 3.

Such an assembly as constructed above is then mounted to the movable housing 38. The movable housing 38 has two holes 56 each for receiving the optical connector 19. A slit 58 extending in a direction of insertion of the optical connector 19 is formed so as to correspond to each hole 56. In inserting the optical connector 19 into the corresponding hole 56, the insertion of the optical connector 19 is allowed only when a projection 59 provided on one side of the optical connector 19 comes to alignment with the corresponding slit 58. Accordingly, the rotational positional relation between the optical connector 19 and the corresponding optical semiconductor assembly 16 can be made always fixed. The fixing of the receptacle 42 to the movable housing 38 may be made by adhesion or fitting.

On the other hand, a printed wiring board 18 for providing an electronic circuit to be connected to each optical semiconductor assembly 16 is mounted in the fixed housing 36. In the case that each chip 22 is a light emitting element, the electronic circuit is a drive circuit for the light emitting element, whereas in the case that each chip 22 is a photodetector, the electronic circuit is an amplifying circuit for amplifying an electrical signal to be output from the photodetector, for example. The printed wiring board 18 is provided with a plurality of lead pins 34 for electrically connecting the electronic circuit to a mother board 8 (see FIG. 1). The lead pins 34 are fixed by soldering to the printed wiring board 18 so as to extend perpendicularly to the plane of the printed wiring board 18. The fixed housing 36 is formed with two holes 60 for allowing pass of the lead pins 34 when the printed wiring board 18 is mounted in the fixed housing 36. Further, a plurality of blocks 62 and hooks 64 for mounting the printed wiring board 18 by fitting are formed on the inside surface of the fixed housing 36.

An assembly including the optical semiconductor assemblies 16, the receptacle 42, and the movable housing 38 is pivotably mounted to the fixed housing 36 by engaging two holes 66 formed through the movable housing 38 with two projections 68 formed on the fixed housing 36 so as to correspond to the two holes 66. A projection 70 projecting inside of the movable housing 38 is formed in the vicinity of one of the two holes 66 of the movable housing 38. In correspondence with the projection 70, two recesses 72A and 72B are formed in the vicinity of one of the two projections 68 of the fixed housing 36.

Temporary fixation of a relative positional relation between the movable housing 38 and the fixed housing 36 in association with pivotal movement of the movable housing 38 is decided by engaging the projection 70 with one of the recesses 72A and 72B. That is, when the projection 70 is engaged with the recess 72A, a first condition is obtained such that a direction of attachment/detachment of the optical connector 19 is substantially parallel to a plane perpendicular to the lead pins 34. In contrast, when the projection 70 is engaged with the recess 72B, a second condition is obtained such that the direction of attachment/detachment of the optical connector 19 is inclined to the plane perpendicular to the lead pins 34. The first and second conditions will be described later in more detail.

In this preferred embodiment, electrical connection between each optical semiconductor assembly 16 and the printed wiring board 18 is obtained by a flexible printed wiring board 74. The flexible printed wiring board 74 is first fixed by soldering to one of the leads 24 and the printed wiring board 18, and is next fixed by soldering to the other through a hole 78 of the fixed housing 36. Finally, a cover 80 is mounted to the fixed housing 36 by fitting, thereby completing the receptacle optical module.

Figure 5A:
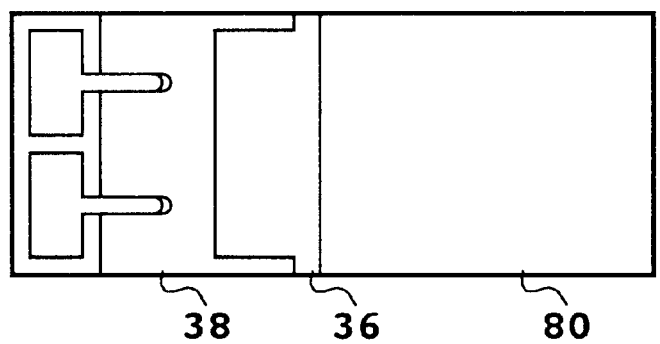
FIGS. 5A and 5B are a plan view and a side view of the receptacle optical module in the first preferred embodiment, respectively.
Figure 5B:
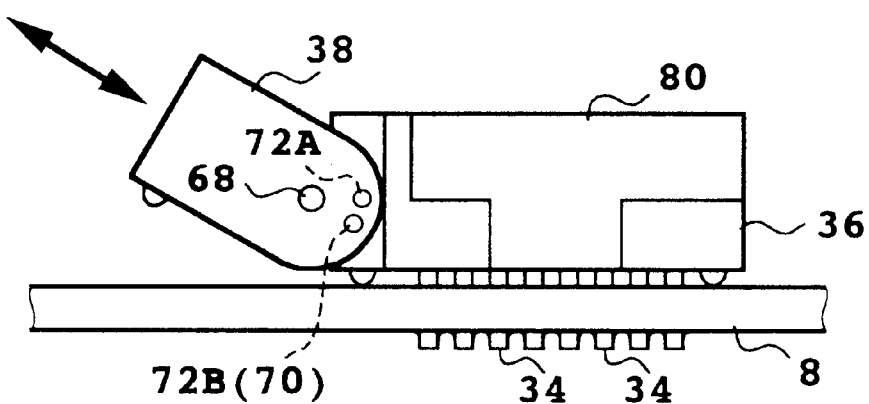
Figure 5C:
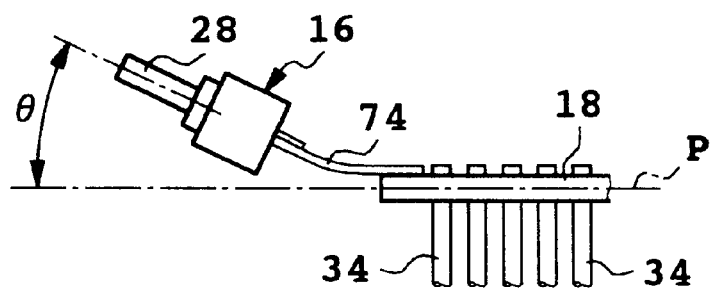
FIG. 5C is a side view illustrating a movable range of an optical semiconductor assembly in the first preferred embodiment.

FIGS. 5A and 5B are a plan view and a side view of the completed receptacle optical module in the first preferred embodiment, respectively, and FIG. 5C is a side view illustrating a movable range of each optical semiconductor assembly 16 (movable housing 38) in the first preferred embodiment.

Figure 2:
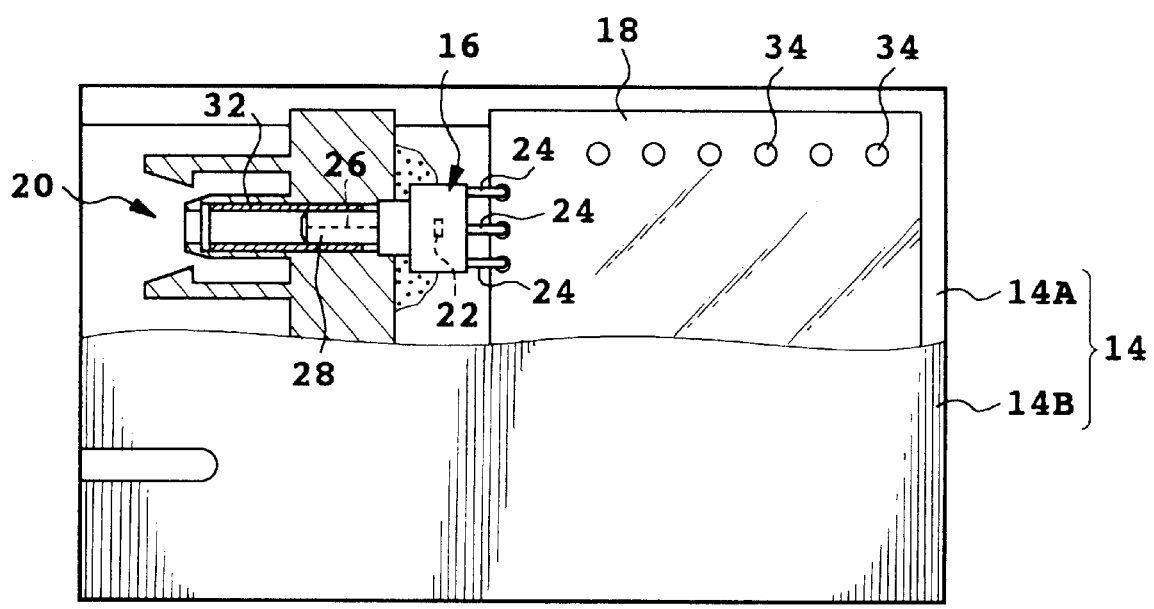
FIG. 2 is a partially cutaway, plan view of a receptacle optical module in the prior art.

As best shown in FIG. 5B, the projection 70 of the movable housing 38 is engaged with the recess 72B of the fixed housing 36, and the second condition mentioned above is accordingly obtained. To sufficiently exhibit the technical effects of the receptacle optical module, it is preferable to carry out the attachment/detachment operation of the optical connector 19 (see FIG. 3) with respect to the movable housing 38 in the second condition. This is due to the following reason. This module is mounted on the mother board 8 by soldering the lead pins 34 to the mother board 8. That is, the fixed housing 36 is mechanically fixed to the mother board 8 by the lead pins 34. Simultaneously, the chip 22 of each optical semiconductor assembly 16 and the printed wiring board 18 are electrically connected to the mother board 8 by the lead pins 34. In the prior art shown in FIGS. 2 and 3, the direction of attachment/detachment of the optical connector 19 is limited to a direction parallel to a plane P (see FIG. 5C) perpendicular to the lead pins 34. Accordingly, the force for attachment/detachment of the optical connector 19 acts in a direction of bending of the lead pins 34 in the prior art, thus reducing the reliability. To the contrary, according to this preferred embodiment, the optical connector 19 can be attached/detached in a direction inclined to the plane P in the second condition. Accordingly, the force for attachment/detachment of the optical connector 19 hardly acts in the direction of bending of the lead pins 34, thereby improving the reliability.

An angular range θ of pivotal movement of each optical semiconductor assembly 16 (movable housing 38) shown in FIG. 5C can be set according to the position of the hole 72B of the fixed housing 36. In this preferred embodiment, electrical connection between each optical semiconductor assembly 16 and the printed wiring board 18 is obtained by the flexible printed wiring board 74. Since the flexible printed wiring board 74 can sufficiently endure repetition of bending, the angle θ can be set to a sufficiently large angle. Even though the angle θ is set to 90°, for example, there is no possibility of reduction in reliability of the module. After the optical connector 19 is mounted to the movable housing 38, the movable housing 38 is usually returned to the first condition, thereby allowing the plug-in unit 6 (see FIG. 1) to be accommodated into a small space in the rack 4.

In this preferred embodiment, the attachment/detachment of the optical connector 19 can be carried out in the second condition. Accordingly, the optical connector 19 can be attached/detached more easily as compared with the prior art. Further, the attachment/detachment operation of the optical connector 19 in the second condition does not require any extra space on the mother board 8. Accordingly, a degree of freedom of location of the receptacle optical module on the mother board 8 can be made larger than that in the prior art.

Figure 6:
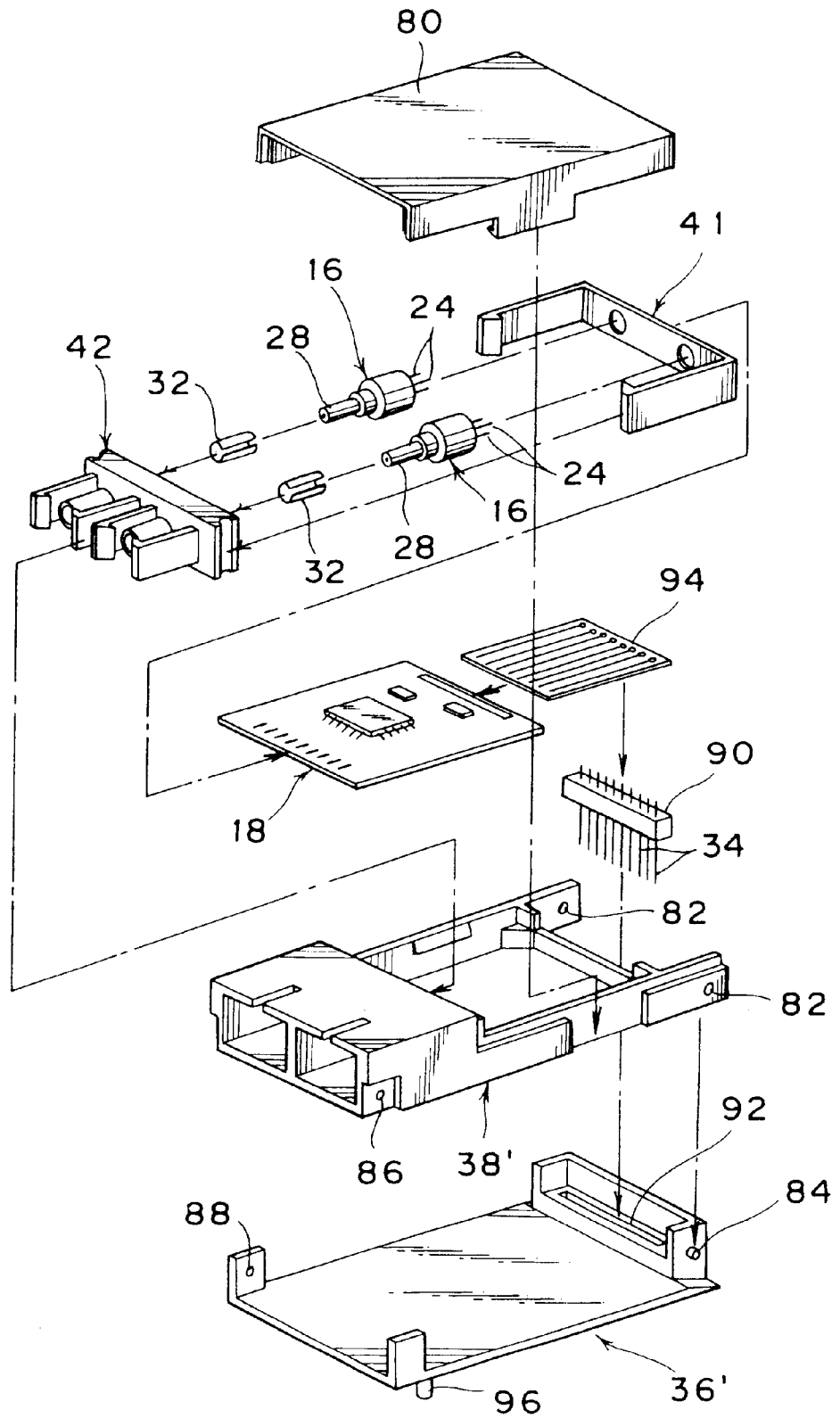
FIG. 6 is an exploded perspective view showing a second preferred embodiment of the receptacle optical module according to the present invention.

FIG. 6 is an exploded perspective view showing a second preferred embodiment of the receptacle optical module according to the present invention. In this preferred embodiment, not only an assembly consisting of a receptacle 42, elastic sleeves 32, optical semiconductor assemblies 16, and a hook member 41, but also a printed wiring board 18 is mounted in a movable housing 38'. The movable housing 38' is pivotably supported to a fixed housing 36' by engaging two holes 82 of the movable housing 38' with two projections 84 of the fixed housing 36' respectively corresponding to the two holes 82. Two projections 86 are formed at an end portion of the movable housing 38' opposite to the center of pivotal movement of the movable housing 38'. In correspondence with the two projections 86, the fixed housing 36' has two recesses 88 for engaging the two projections 86. With this structure, the movable housing 38' can be temporarily fixed in the first condition. A plurality of lead pins 34 are fixed to an insulator block 90 by press fit or adhesion so as to extend perpendicularly to the insulator block 90. The insulator block 90 is mounted in the fixed housing 36' in such a manner that the lead pins 34 pass through a hole 92 of the fixed housing 36'.

In this preferred embodiment, both the optical semiconductor assemblies 16 and the printed wiring board 18 are fixed to the movable housing 38', so that there is no possibility of change in positional relation between the optical semiconductor assemblies 16 and the printed wiring board 18. Accordingly, the leads 24 of each optical semiconductor assembly 16 can be directly connected to the printed wiring board 18 by soldering. In this preferred embodiment, however, a relative positional relation between the printed wiring board 18 and the lead pins 34 changes with pivotal movement of the movable housing 38'. Accordingly, a flexible printed wiring board 94 is used to provide electrical connection between the printed wiring board 18 and the lead pins 34. A cover 80 of the module is mounted to the movable housing 38'.

Figure 7A:
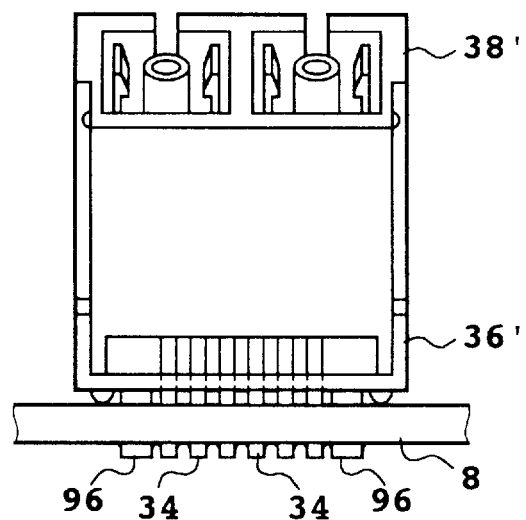
FIGS. 7A and 7B are an elevational view and a side view of the receptacle optical module in the second preferred embodiment, respectively.
Figure 7B:
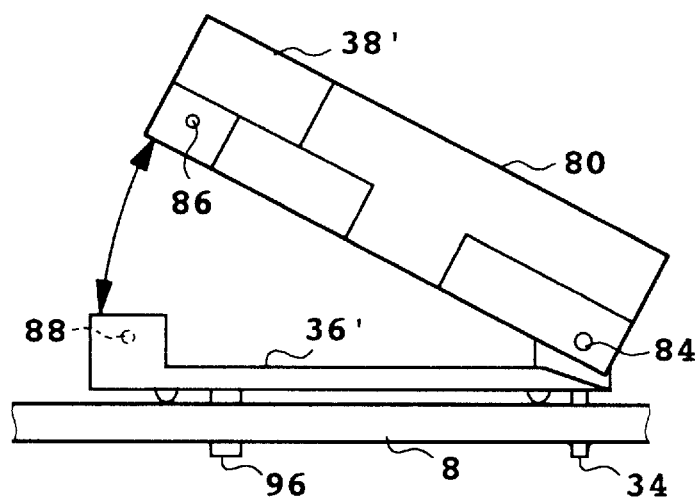
Figure 7C:
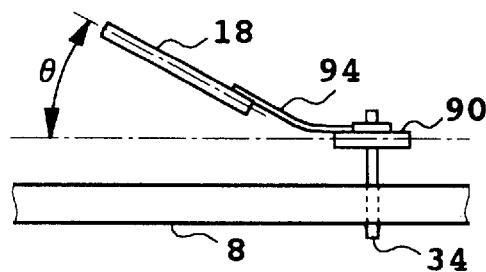
FIG. 7C is a side view illustrating a movable range of a printed wiring board in the second preferred embodiment.

FIGS. 7A and 7B are an elevational view and a side view of the receptacle optical module in the second preferred embodiment, respectively, and FIG. 7C is a side view illustrating a movable range of the printed wiring board 18 (movable housing 38'). In this preferred embodiment, the lead pins 34 are arranged in one line in the vicinity of the center of pivotal movement of the movable housing 38', so that the fixed housing 36' is apt to be displaced in performing attachment/detachment of the optical connector 19. To cope with this, two pins 96 are provided at an end portion of the fixed housing 36' opposite to the center of pivotal movement of the movable housing 38', and the two pins 96 are fixed to the mother board 8. Also in the second preferred embodiment, the movable housing 38' for supporting the optical semiconductor assemblies 16 is pivotable with respect to the fixed housing 36', and various effects similar to those in the first preferred embodiment can therefore be obtained.

A third preferred embodiment of the present invention will now be described with reference to FIGS. 8 to 12B. In this preferred embodiment, an optical connector 19' that can be attached/detached more easily is used. As well shown in FIG. 11A, the optical connector 19' is provided with an optical fiber 40, a ferrule 30 in which the optical fiber 40 is inserted and fixed, a connector housing 98 for accommodating the ferrule 30 so as to allow axial movement of the ferrule 30, and a coil spring 100 interposed between the ferrule 30 and the connector housing 98. A small-diameter portion 102 is formed at an intermediate portion of the connector housing 98, and a tapering portion 104 forming a part of a circular cone is formed at a front end of the connector housing 98.

Figure 8:
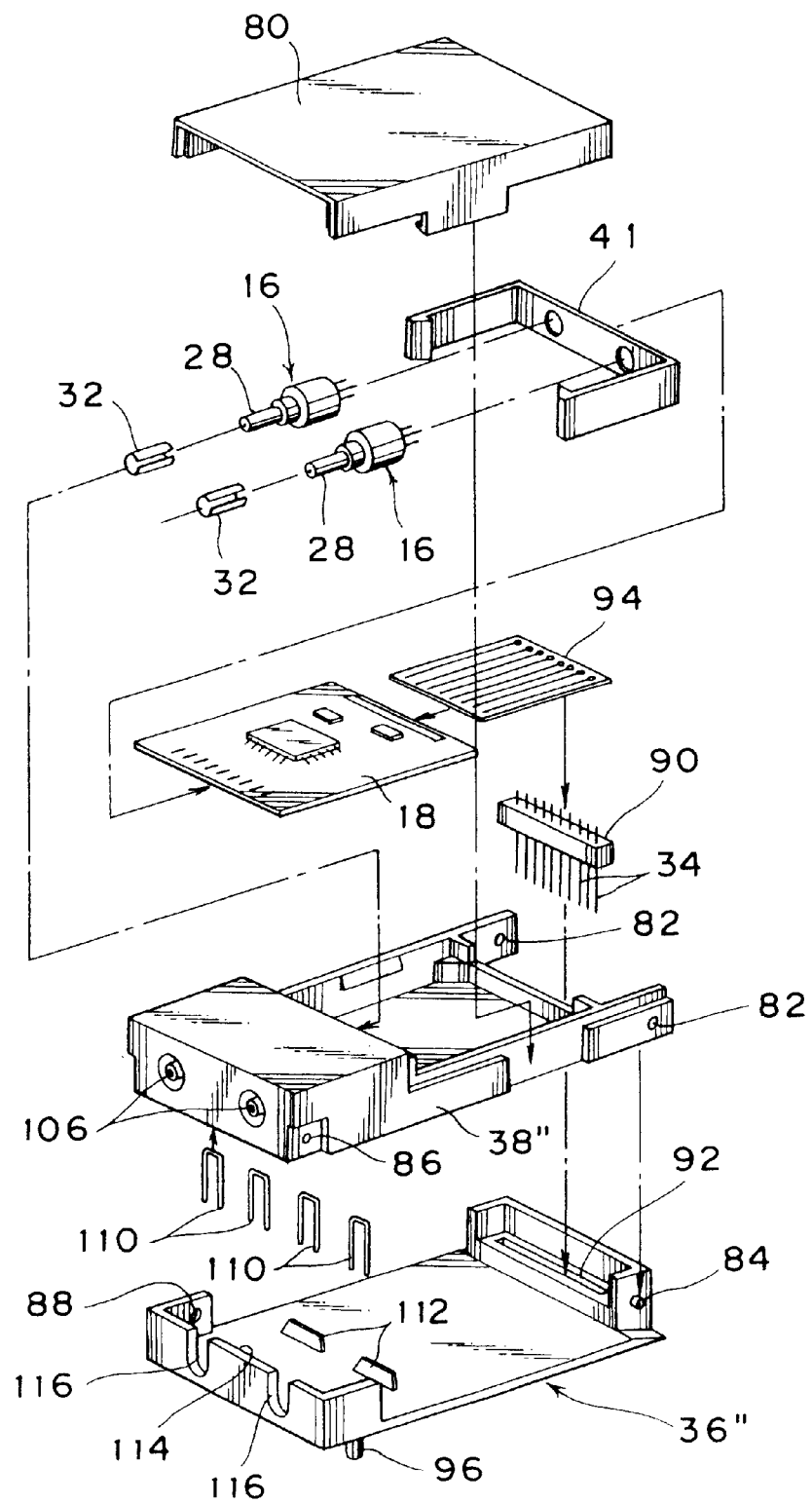
FIG. 8 is an exploded perspective view showing a third preferred embodiment of the receptacle optical module according to the present invention.

As shown in FIG. 8, a fixed housing 36" and a movable housing 38" have substantially the same configurations as those of the fixed housing 36' and the movable housing 38' in the second preferred embodiment shown in FIG. 6, respectively, with the exception that configurations for additional functions are provided in the fixed housing 36" and the movable housing 38".

Figure 9:
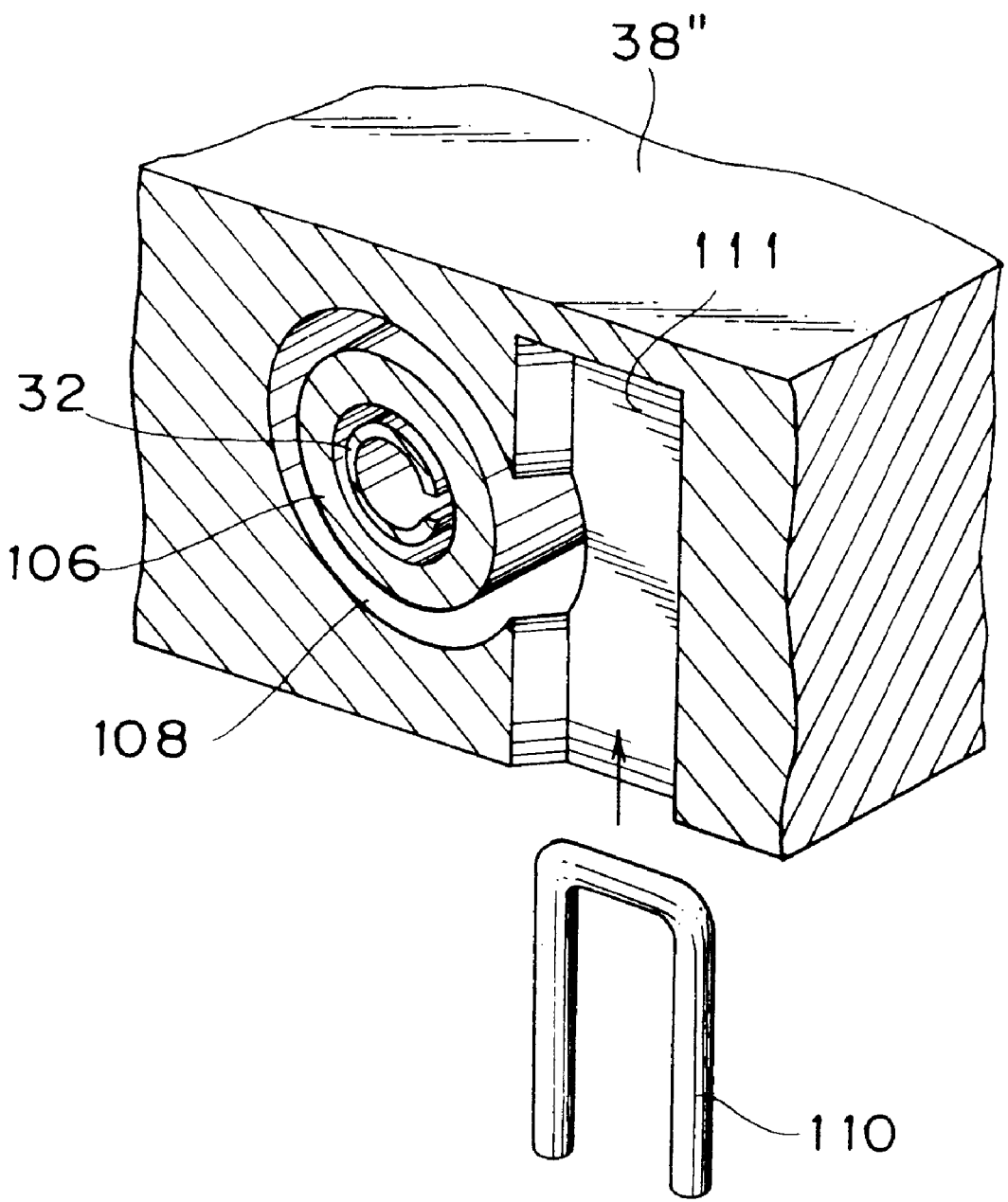
FIG. 9 is a partially cutaway, perspective view showing mounting of a U-shaped spring into a movable housing in the third preferred embodiment.

As shown in FIG. 9, the movable housing 38" is integrally formed with a sleeve portion 106 (corresponding to the sleeve portion 46 shown in FIG. 4) having a hole for engaging an elastic sleeve 32. A circular groove 108 for receiving the connector housing 98 of the optical connector 19' is defined between the sleeve portion 106 and a body portion of the movable housing 38". The body portion of the movable housing 38" is formed with a substantially rectangular hole 111 for engaging a U-shaped spring 110 at a position adjacent to the groove 108. A part of the hole 111 is open to the groove 108. Accordingly, by engaging the U-shaped spring 110 into the hole 111, a part of the U-shaped spring 110 comes to exposure into the groove 108.

As shown in FIG. 8, totally four (two pairs) U-shaped springs 110 are used, and each pair of the four U-shaped springs 110 are provided for each sleeve portion 106. The fixed housing 36" is provided with two tapering projections 112 each adapted to come into abutment against the lower ends of each pair of U-shaped springs 110 and to elastically deform the U-shaped springs 110 to increase the space between the U-shaped springs 110 of each pair when the movable housing 38" is moved to the first condition. Further, the fixed housing 36" has a stopper 114 adapted to come into abutment against a rear end of the optical connector 19' in the first condition. The stopper 114 has two cutouts 116 each for seating the optical connector 19' mounted to the module.

Figure 10A:
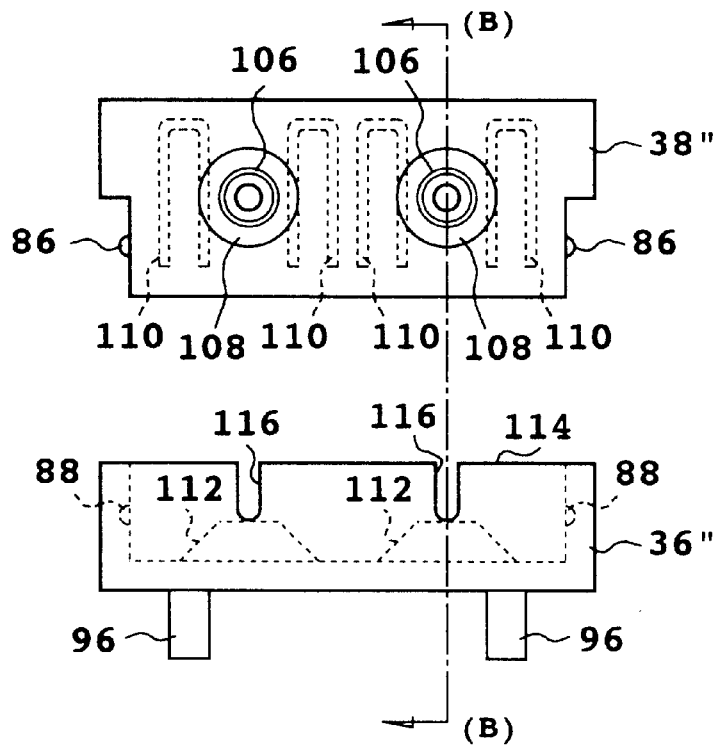
FIG. 10A is an elevational view of the receptacle optical module of the third embodiment before mounting the movable housing to the fixed housing and with the movable housing being in a first condition.
Figure 10B:
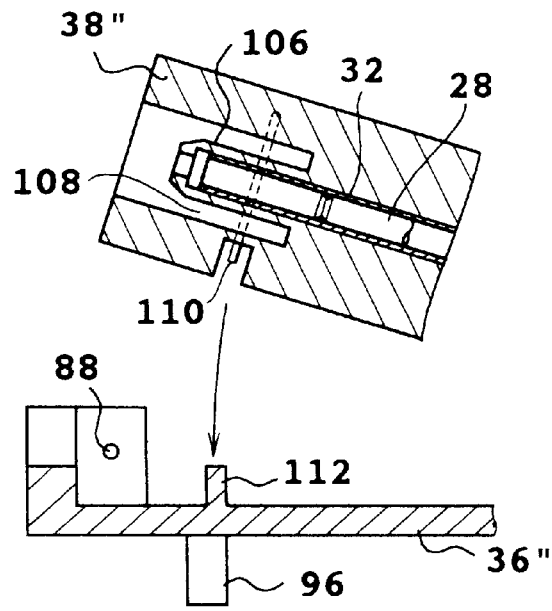
FIG. 10B is a cross-sectional view taken along line B—B of FIG. 10A, illustrating the movable housing in its second condition.

FIG. 10A is an elevational view of the receptacle optical module in the third preferred embodiment, and FIG. 10B is a cross section taken along the line (B)—(B) in FIG. 10A. FIG. 10A shows the first condition of the receptacle optical module. In FIG. 10B, however, the second condition is shown, and the optical connector 19' has been removed from the movable housing 38.

Figure 11A:
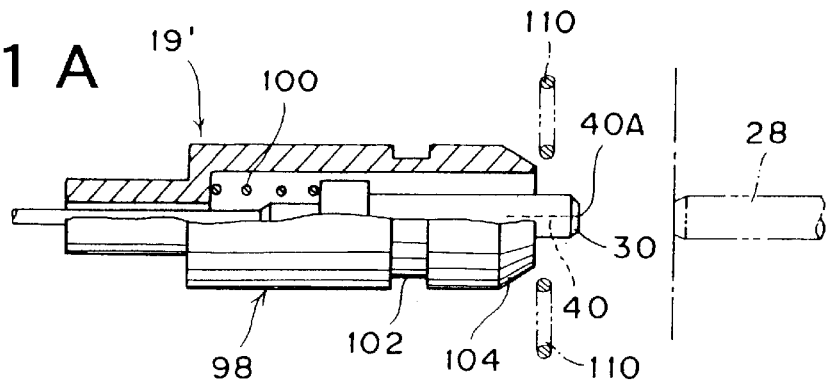
FIGS. 11A to 11C are partially cutaway, side views illustrating an attachment/detachment operation of an optical connector in the third preferred embodiment.
Figure 11B:
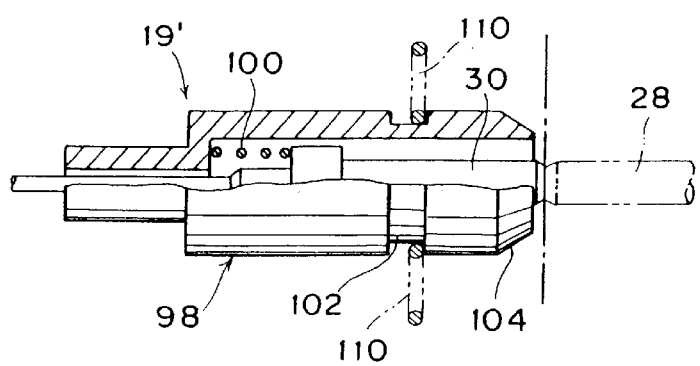

An attachment operation of the optical connector 19' will now be described with reference to FIGS. 11A to 12B. As shown in FIG. 11A, the connector housing 98 of the optical connector 19' is inserted into the groove 108 of the movable housing 38" (see FIG. 10B). During insertion of the connector housing 98 into the groove 108, the corresponding pair of U-shaped springs 110 are deformed by the tapering portion 104 of the connector housing 98, and each U-shaped spring 110 is retracted into the hole 111 of the movable housing 38" (see FIG. 9). Accordingly, the connector housing 98 can be further inserted. When the U-shaped springs 110 relatively come to the position of the small-diameter portion 102 of the connector housing 98 as shown in FIG. 11B, the U-shaped springs 110 restore their original shapes to seat in the small-diameter portion 102. In this condition, the connector ferrule 30 abuts against the ferrule 28, and an abutting force of the connector ferrule 30 is given by the coil spring 100. Since the U-shaped springs 110 seat in the small-diameter portion 102, the condition shown in FIG. 11B is maintained even when the optical connector 19' is released from an operator's hand.

Figure 12A:
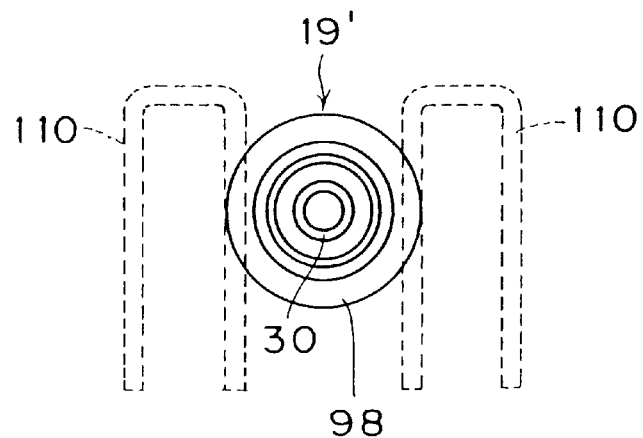
FIGS. 12A and 12B are elevational views showing different positional relations between U-shaped springs and a connector housing in the third preferred embodiment.
Figure 12B:
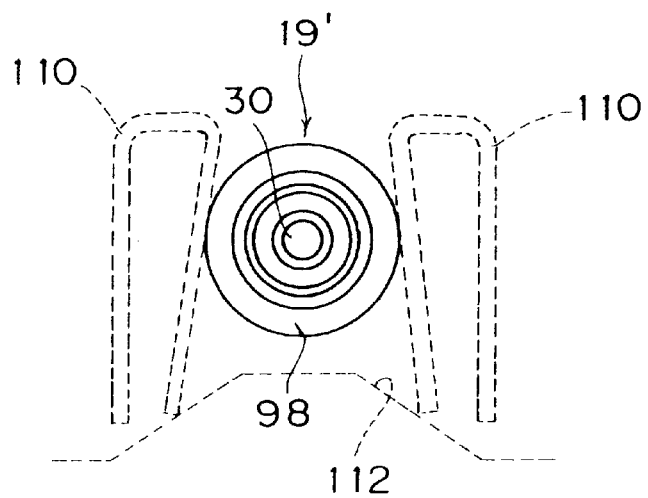

A positional relation between the U-shaped springs 110 and the connector housing 98 at this time is shown in FIG. 12A. FIG. 12B shows a condition where the U-shaped springs 110 are deformed by the connector housing 98.

Figure 11C:
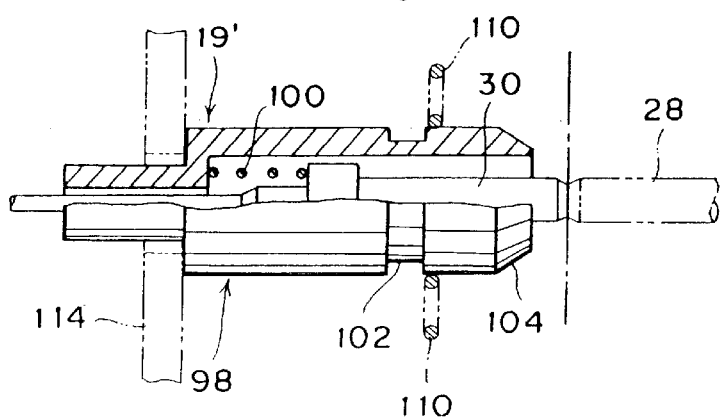

When the movable housing 38" is closed with respect to the fixed housing 36" to obtain the first condition, each U-shaped spring 110 is deformed by the taper of the corresponding projection 112 of the fixed housing 36". As a result, the connector housing 98 is retracted by a biasing force of the coil spring 100 until the rear end of the connector housing 98 comes to abutment against the stopper 114 as shown in FIG. 11C. At this time, the abutting force of the connector ferrule 30 against the ferrule 28 is kept by the biasing force of the coil spring 100, thereby obtaining optical coupling between the optical connector 19' and the corresponding optical semiconductor assembly 16. Since the connector housing 98 is retracted as shown in FIG. 11C, the U-shaped springs 110 come out of the small-diameter portion 102 of the connector housing 98. Accordingly, when the movable housing 38" is opened again from the fixed housing 36" to obtain the second condition, the optical connector 19' can be easily removed from the movable housing 38". According to this preferred embodiment as mentioned above, the attachment/detachment of the optical connector 19' can be automatically carried out in response to the operation of the movable housing 38".

According to the present invention as described above, it is possible to provide a receptacle optical module which can eliminate a reduction in reliability due to attachment/detachment of an optical connector. Further, it is possible to provide a receptacle optical module which can facilitate attachment/detachment of an optical connector. Further, it is possible to provide a receptacle optical module which can be mounted on a mother board (substrate) with a large degree of freedom of location.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A receptacle optical module comprising:
   a fixed housing adapted to be fixed to a substrate;
   an optical semiconductor assembly having an optical semiconductor chip for performing conversion between an optical signal and an electrical signal;
   a plurality of lead pins fixed to said fixed housing for mechanically fixing said fixed housing to said substrate and electrically connecting said optical semiconductor chip to said substrate;
   a movable housing pivotably provided on said fixed housing for supporting said optical semiconductor assembly; and
   a receptacle mechanism for detachably holding an optical connector in said movable housing so as to optically connect said optical semiconductor chip to said optical connector.

2. A receptacle optical module according to claim 1, further comprising a printed wiring board for providing an electronic circuit for performing a process on said electrical signal.

3. A receptacle optical module according to claim 2, wherein:
   said printed wiring board is fixed to said fixed housing; and
   said plurality of lead pins are provided on said printed wiring board so as to extend perpendicularly to said printed wiring board.

4. A receptacle optical module according to claim 3, further comprising a flexible printed wiring board for electrically connecting said optical semiconductor assembly and said printed wiring board.

5. A receptacle optical module according to claim 2, wherein:
   said printed wiring board is fixed to said movable housing; and
   said receptacle optical module further comprises an insulator block for fixing said plurality of lead pins to said fixed housing.

6. A receptacle optical module according to claim 5, further comprising a flexible printed wiring board for electrically connecting said printed wiring board and said plurality of lead pins.

7. A receptacle optical module according to claim 1, wherein:
   said optical semiconductor assembly further has a first optical fiber having a first end optically connected to said optical semiconductor chip and a first ferrule in which said first optical fiber is inserted and fixed;
   said optical connector has a second optical fiber and a second ferrule in which said second optical fiber is inserted and fixed; and
   said receptacle mechanism includes an elastic sleeve into which said first and second ferrules are inserted so that a second end of said first optical fiber comes to abutment against an end face of said second optical fiber in alignment with each other.

8. A receptacle optical module according to claim 7, wherein:
   said movable housing is pivotable between a first condition where a direction of attachment/detachment of said optical connector is substantially parallel to a plane perpendicular to said lead pins and a second condition where said direction is inclined to said plane;
   said optical connector is attachable/detachable with respect to said receptacle mechanism in said second condition; and
   said fixed housing has a stopper against which a rear end of said optical connector abuts in said first condition.

* * * * *